(12) United States Patent
Sun et al.

(10) Patent No.: US 9,244,188 B2
(45) Date of Patent: Jan. 26, 2016

(54) SYSTEM AND METHOD FOR ESTIMATING A NUCLEAR MAGNETIC RESONANCE RELAXATION TIME CUTOFF

(75) Inventors: Boqin Sun, Concord, CA (US); Emmanuel Toumelin, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 800 days.

(21) Appl. No.: 13/565,994

(22) Filed: Aug. 3, 2012

(65) Prior Publication Data

US 2014/0035574 A1    Feb. 6, 2014

(51) Int. Cl.
    *G01V 3/14*    (2006.01)
(52) U.S. Cl.
    CPC ........................... *G01V 3/14* (2013.01)
(58) Field of Classification Search
    CPC ....................................................... G01V 3/14
    See application file for complete search history.

(56) References Cited

U.S. PATENT DOCUMENTS

| 5,200,699 | A | 4/1993 | Baldwin et al. |
| 6,072,314 | A | 6/2000 | Oraby |
| 6,573,715 | B2 | 6/2003 | King et al. |
| 6,833,699 | B2 * | 12/2004 | Galford et al. ................ 324/303 |
| 6,959,246 | B2 | 10/2005 | Herron |
| 6,977,499 | B2 | 12/2005 | Kiesl et al. |
| 7,755,354 | B2 * | 7/2010 | Akkurt ......................... 324/303 |
| 7,893,692 | B2 | 2/2011 | Minh |
| 2003/0094946 | A1 * | 5/2003 | Galford et al. ................ 324/303 |

* cited by examiner

*Primary Examiner* — Dixomara Vargas

(57) ABSTRACT

A nuclear magnetic resonance relaxation time cutoff between results for a bound-water index of rock and a free-fluid index of the rock is determined. The determination is made based on measured and predicted values for permeability and/or wettability over a set of core plugs. The determination does not require a nuclear magnetic resonance operation performed on the core plugs under irreducible water saturation.

15 Claims, 3 Drawing Sheets

SYSTEM AND METHOD FOR ESTIMATING A NUCLEAR MAGNETIC RESONANCE RELAXATION TIME CUTOFF

FIELD

The disclosure relates to determining a nuclear magnetic resonance relaxation time cutoff between results for a bound-water index of rock and a free-fluid index of the rock without requiring a nuclear magnetic resonance operation performed on the core plugs under irreducible water saturation.

BACKGROUND

Nuclear magnetic resonance (NMR) well logs are commonly used to interpret rock pore size and provide essential information for petrophysical evaluation. For a porous rock of porosity $\phi$ and hydraulic permeability k, the time-domain spin echo trains M(t) measured by the NMR antenna is usually decomposed as a N-exponential series of partial porosities (amplitudes) $\{A_j\}_{j=1\ldots N}$ corresponding to relaxation times $\{T_{2j}\}_{j=1\ldots N}$ scaled logarithmically:

$$M(t) = \sum_{j=1}^{N} A_j \exp(-t/T_{2j}). \quad (1)$$

The formed distribution of $\{A_j\}_{j=1\ldots N}$ as a function of $\{T_{2j}\}_{j=1\ldots N}$ is usually called the $T_2$ distribution and is often mapped to the distribution of pore sizes encountered in the porous rock. Assuming the pore space is saturated with light liquids whose bulk relaxation times are in the order of or more than 1000 ms, the overall $T_2$ relaxation of fluids in pores is dominated by the surface relaxation mechanism: larger values of $T_2$ correspond to larger pores, and smaller values correspond to smaller pores.

The relative amplitude $A_j$ assigned to each $T_{2j}$ bin corresponds to a fractional porosity assigned to a given pore size range. If a free-fluid relaxation cutoff is known, integration of the $T_2$ distribution amplitudes for values of $T_2$ under that cutoff provide the bound-water index (BVI) of the rock, while free-fluid index (FFI) is obtained above that cutoff:

$$BVI = \sum_{j=1}^{N_{cutoff}} A_j \quad (2)$$

and $$FFI = \sum_{j=N_{cutoff}}^{N} A_j \quad (3)$$

knowing that the two pore volumes add up to the total rock porosity $$BVI + FFI = \phi. \quad (4)$$

Using a single $T_2$ cutoff to calculate bound-water index is simple and practical. However fluid mobility is not just dependent on pore throat size, but also on the amount of wetting fluid in the pores. One introduces a saturation profile to more accurately represent bound fluid changes with pore size or $T_2$ relaxation, and a commonly used form of saturation profile is the generalized logistic function of $T_2$:

$$S(T_2) = \frac{a_1 - a_2}{(1 + T_2/T_{2cutoff})^\alpha} + a_2 \quad (5)$$

where default values are for the parameters: $a_1=1$, $a_2=0$, $\alpha=2$ and $T_{2cutoff}=33$ ms. This saturation profile is characteristic of a given rock facies. The spectral BVI (SBVI) for a given saturated rock sample within that rock facies can be calculated from the $T_2$ distribution of that sample as follows:

$$SBVI = \sum_{j=1}^{N} A_j S(T_{2j}) = \sum_{j=1}^{N} A_j \left( \frac{a_1 - a_2}{(1 + T_{2j}/T_{2cutoff})^\alpha} + a_2 \right). \quad (6)$$

A spectral FFI (SFFI) is also obtained as follows:

$$SFFI = \phi - SBVI = \sum_{j=1}^{N} A_j \left[ 1 - \left( \frac{a_1 - a_2}{(1 + T_{2j}/T_{2cutoff})^\alpha} + a_2 \right) \right]. \quad (7)$$

As such BVI (or SBVI) may be quantified along with the corresponding irreducible water saturation:

$$S_{wir} = BVI/\phi \quad (8)$$

or in spectral form:

$$S_{wir} = SBVI/\phi. \quad (9)$$

The calibration of the cutoff value $$T_{2cutoff} = \{T_{2j}\}_{j=N_{cutoff}}$$

is usually accomplished through time-consuming special core analysis protocol that is not always consistent from vendor to vendor:

After proper cleaning, a cylindrical core plug representative of the studied rock facies is fully saturated with brine and then measured in a laboratory NMR spectrometer. This produces a first $T_2$ distribution at 100% water saturation ($S_w=100\%$).

The core plug is subsequently desaturated with non-wetting fluid (air or oil) following different procedures—usually through spinning of the sample until the maximum centrifuge speed is reached, or through centrifugation or porous-plate displacement until a target capillary pressure is met. The final fluid saturation level of his process is $S_{wir}$, and may or may not be the right value that represents reservoir conditions.

A new NMR measurement at $S_w=S_{wir}$ defines the NMR signal of bound water; the value of $T_{2cutoff}$ is then determined as the $T_2$ value where the bound water volume determined with the $S_w=100\%$ experiment (BVI as determined from Eq. (2) or SBVI as determined from Eq. (7)) is equal to the water volume remaining in the $S_w=S_{wir}$ experiment.

SUMMARY

One aspect of the disclosure relates to a system configured to determine a relaxation time cutoff for implementation in analysis of nuclear magnetic resonance data. In some embodiments, the system comprises one or more processors configured to execute computer program modules. The computer program modules may comprise one or more of a data module, a parameter fit module, a cutoff fit module, and/or other modules.

The data module is configured to obtain, for individual ones of a plurality of core plugs taken from a geological volume of interest, (i) measured values of permeability and/or wettability, and porosity, and (ii) nuclear magnetic resonance measurements taken under full brine-saturation.

The parameter fit module is configured to determine, for individual ones of a plurality of potential relaxation time cutoffs, values for one or more model parameters that parameterize a model that is further parameterized by relaxation time cutoff. The parameter fit module predicts permeability and/or wettability as a function of porosity and nuclear magnetic resonance measurements. This determination comprises, for a first potential relaxation time, identifying values for the one or more model parameters that fit the predictions of permeability or porosity yielded by the model at the first potential relaxation time for the core plugs with the measured values of permeability and/or wettability for the individual core plugs.

The cutoff fit module is configured to identify a relaxation time cutoff from the plurality of potential relaxation time cutoffs that provides an enhanced fit of the predictions of permeability and/or wettability yielded by the model with the measured values or permeability and/or wettability for the individual core plugs.

Another aspect of the invention relates to a computer-implemented method of determining a relaxation time cutoff for implementation in analysis of nuclear magnetic resonance data. In some embodiments, the method comprises obtaining, for individual ones of a plurality of core plugs taken from a geological volume of interest, (i) measured values of permeability and/or wettability, and porosity, and (ii) nuclear magnetic resonance measurements taken under full brine-saturation; determining, for individual ones of a plurality of potential relaxation time cutoffs, values for one or more model parameters that parameterize a model that is further parameterized by relaxation time cutoff, and predicts permeability and/or wettability as a function of porosity and nuclear magnetic resonance measurements, wherein such determination comprises, for a first potential relaxation time, identifying values for the one or more model parameters that fit the predictions of permeability and/or wettability yielded by the model at the first potential relaxation time for the core plugs with the measured values of permeability and/or wettability for the core plugs; and identifying a relaxation time cutoff from the plurality of potential relaxation time cutoffs that provides an enhanced fit of the predictions of permeability and/or or wettability yielded by the model with the measured values or permeability and/or wettability for the individual core plugs.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
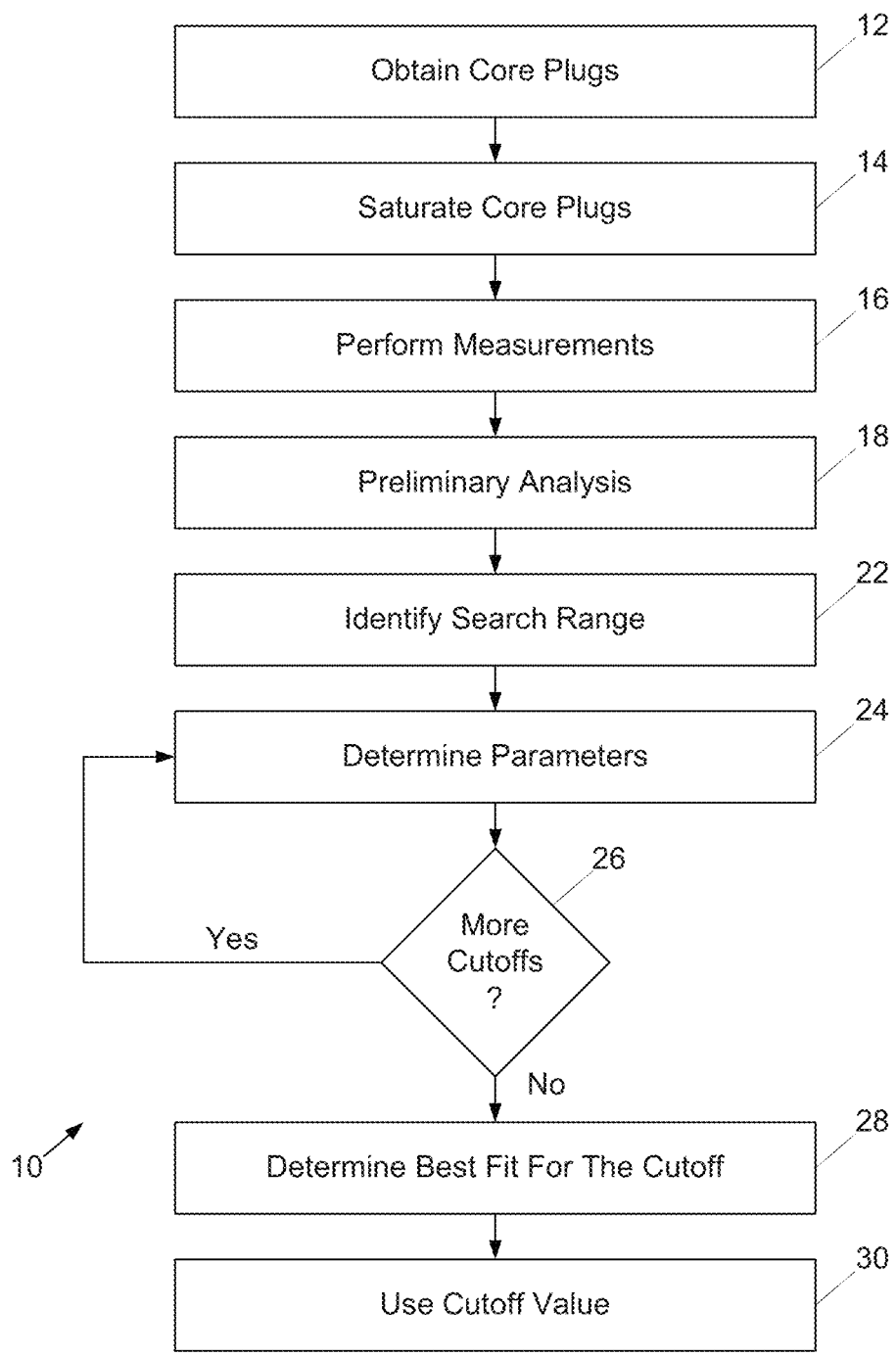
FIG. 1 illustrates a system configured to determine a relaxation time cutoff for implementation in analyzing nuclear magnetic resonance data.

The present technology may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present technology may be coded in different languages for application in a variety of computing platforms and environments. It will be appreciated that the scope and underlying principles of the present technology are not limited to any particular computer software technology.

Moreover, those skilled in the art will appreciate that the present technology may be practiced using any one or combination of hardware and software configurations, including but not limited to a system having single and/or multi-processor computer processors system, hand-held devices, programmable consumer electronics, mini-computers, mainframe computers, and the like. The technology may also be practiced in distributed computing environments where tasks are performed by servers or other processing devices that are linked through one or more data communications networks. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present technology. Such devices and articles of manufacture also fall within the spirit and scope of the present technology.

Referring now to the drawings, embodiments of the present technology will be described. The technology can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present technology are discussed below. The appended drawings illustrate only typical embodiments of the present technology and therefore are not to be considered limiting of its scope and breadth.

FIG. 1 illustrates a method 10 of estimating a nuclear magnetic resonance relaxation time cutoff between results for a bound-water index of rock and a free-fluid index of the rock. Various portions of this disclosure discuss $T_2$ transverse relaxation times. This is not intended to be limiting, as the principles described herein with respect to $T_2$ relaxation time could be applied to $T_1$ longitudinal relaxation times, and/or other relaxation times. Method 10 estimates the relaxation time cutoff without requiring NMR $T_2$ measurements on core plugs for both saturated and dry conditions. As such, method 10 may provide a substantial advantage with respect to time, cost, and/or other aspects of the estimation of relaxation time cutoff with respect to conventional estimation techniques.

At an operation 12, a plurality of core plugs from a geological volume of interest are obtained. This may include extracting the core plugs, accessing previously extracted and stored core plugs, and/or obtaining the core plugs in other ways. The core plugs belong to the same petrophysical rock types or facies.

At an operation 14, the plurality of core plugs are saturated. The saturation may be accomplished with a brine. The saturation may include full saturation.

At an operation 16, standard measurements may be performed on the individual core plugs. These measurements may generate results including measured values for one or more of hydraulic permeability $k_{i,meas}$, wettability index $IW_{i,meas}$, and porosity $\phi_i$. Nuclear magnetic resonance measurements may be performed either on the same set of core plugs to obtain corresponding $T_2$ relaxations distributions (e.g., $\{A_j^i, T_{2j}^i\}_{j=1...N}$) under full saturation or may use the log data on the depths where the core plugs are acquired. In some embodiments, the techniques described herein may be performed on measurements in which the hydrocarbon signal remains in the free-fluid window.

At an operation 18, the results generated at operation 16 may be preliminarily analyzed to identify suspicious results (e.g., high permeability due to mechanical damage to one or more core plugs). Results corresponding to a core plug that yielded suspicious results may be discarded from further analysis.

At an operation 22, a search range for $N_{cutoff}$ is determined. This may be determined arbitrarily, and/or based on previous determinations for similar rock types and/or facies. The search range may include a plurality of values for $N_{cutoff}$.

At an operation 24 values for parameters of a model that predicts permeability and/or wettability of the individual core plugs are determined. The model may yield permeability and/or wettability as a function of porosity, bound water volume, free fluid volume, and/or other variables. The model may be, for example, the Coates equation, and/or other models. The Coates equation is given as:

$$k_{i,pred} = \left[\left(\frac{\phi_i}{a}\right)^2 x_i\right]^b, \quad (10)$$

where a, b, and $N_{cutoff}$ (relaxation time cutoff) are model parameters characteristic of the rock facies as a group and where $\phi_i$ is the porosity and $x_i$ is the ratio of bound-volume to free-fluid indices for this rock sample, $$x_i = \sum_{j=1}^{N_{cutoff}} A_j^i \bigg/ \sum_{j=N_{cutoff}}^{N} A_j^i, \quad (11)$$

or in spectral form:

$$x_i = \frac{\left\{\sum_{j=1}^{N} A_j^i \left(\frac{a_1 - a_2}{(1 + T_{2j}/T_{2cutoff})^\alpha} + a_2\right)\right\}}{\left\{\sum_{j=1}^{N} A_j^i \left[1 - \left(\frac{a_1 - a_2}{(1 + T_{2j}/T_{2cutoff})^\alpha} + a_2\right)\right]\right\}}. \quad (12)$$

In some embodiments, at operation 22 the model parameters a and b (from equation (10) are determined for a first value for $N_{cutoff}$. The first value for $N_{cutoff}$ is from the plurality of values in the search range determined at operation 22. Determination of the values for a and b may be made by minimizing the measured and predicted (with the model) values for permeability and/or wettability (e.g., across the plurality of core plugs). The mismatch may be expressed as:

$$\chi^2 = \sum_i (k_{i,pred} - k_{i,meas})^2. \quad (13)$$

The conditions at which the mismatched is minimized may be expressed as:

$$\frac{\partial \chi^2}{\partial a} = 0, \frac{\partial \chi^2}{\partial b} = 0, \frac{\partial \chi^2}{\partial a_1} = 0, \frac{\partial \chi^2}{\partial a_2} = 0, \frac{\partial \chi^2}{\partial \alpha} = 0. \quad (14)$$

Once the values for a and b that generate the condition expressed in equation (14) have been found for the first value for $N_{cutoff}$, method 10 proceeds to an operation 26, at which a determination is made as to whether there are additional values for $N_{cutoff}$ in the search range identified at operation 22. Responsive to there being one or more additional values for $N_{cutoff}$ in the search range, for which values for a and b have not been determined at operation 24, method 10 loops back to operation 24. Responsive to the analysis for the values for $N_{cutoff}$ being complete, method 10 proceeds to an operation 28.

Figure 2:
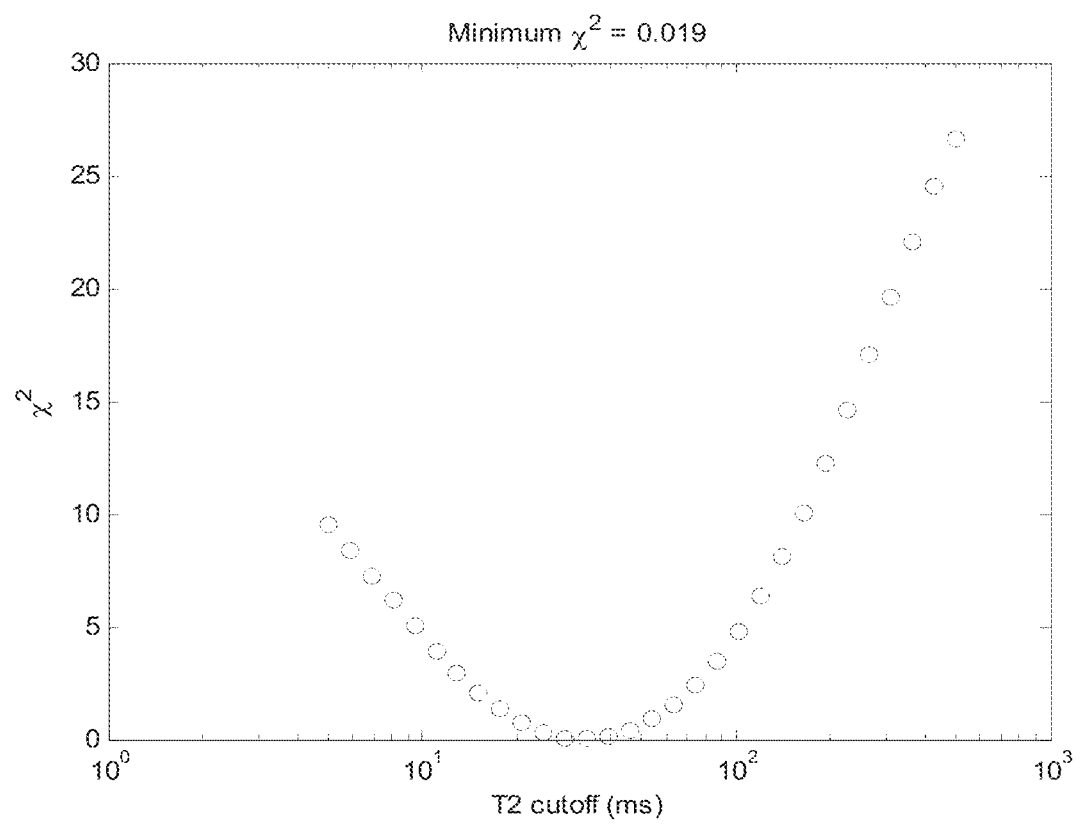
FIG. 2 illustrates a plot of a fit to a measured and predicted variable as a function of relaxation time cutoff.

At operation 28, the values for the minima of $\chi^2$, or $\chi_{min}^2$, across the different values for $N_{cutoff}$ are compared to find a best fit (e.g., the value of $N_{cutoff}$ for which $\chi_{min}^2$ is the smallest). Identifying the best fit will, in turn, yield a value $$T_{2cutoff} = \{T_{2j}\}_{j=N_{cutoff}}$$

for use in interpreting well log data from the geological volume of interest. By way of illustration, FIG. 2 shows a plot of $\chi_{min}^2$ as a function of $T_{2cutoff}$. The identification of the minimum for $\chi_{min}^2$ shown in FIG. 2 will also yield a corresponding $T_{2cutoff}$.

Returning to FIG. 1, at an operation 30, the $T_{2cutoff}$ corresponding to the best fit is used as the relaxation time cutoff in analyzing well log data from the geological volume of interest.

It will be appreciated that the description above of the identification of the relaxation time using a model for permeability is not intended to be limiting. For example, a model predicting wettability (e.g., a wettability index) may be used in conjunction with measurements of wettability made at operation 16 in a manner similar to that described above with respect to the Coates equation. By way of illustration, a wettability profile W that depends on pore size, and therefore on $T_2$, is defined for the rock facies as follows:

$$W(T_2) = \frac{b_1 - b_2}{(1 + T_2/T_{2cutoff}^w)^\beta} + b_2 \quad (15)$$

where $b_1$, $b_2$ and $\beta$ are coefficients comparable to $a_1$, $a_2$ and $\alpha$ in Eq. (5), and where $T_{2cutoff}^w$ is a new $T_2$ cutoff for the wettability profile. The nuclear magnetic resonance wettability index IW is predicted as a function of W for each rock sample i pertaining to the rock facies and is expressed as:

$$IW_{i,pred} = \frac{2\sum_{j=1}^{N} A_j^i W(T_{2j})}{\phi_i} - 1, \quad (16)$$

Now, the discrepancy between the suite of measurements $IW_{i,meas}$ and predictors $IW_{i,pred}$ can be minimized over all the measured sample set using the following cost function:

$$\chi_w^2 = \sum_i (IW_{i,pred} - IW_{i,meas})^2, \quad (17)$$

which is an equation solely parameterized by $b_1$, $b_2$, $\beta$, and $T_{cutoff}^w$ and can be paralleled to Eq. (13) derived for permeability. The same process as that described previously for permeability error minimization can then be followed to produce the optimal value of $T_{2cutoff}^w$ that characterizes the distribution of pore wettability in the rock facies.

The operations of method 10 presented herein are intended to be illustrative. In some embodiments, method 10 may be accomplished with one or more additional operations not described, and/or without one or more of the operations discussed. Additionally, the order in which the operations of method 10 are illustrated in FIG. 1 and described herein is not intended to be limiting.

In some embodiments, method 10 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 10 in response to instructions stored electronically on non-transient electronic storage media. The one or more processing devices may include one or more devices configured through hardware, firmware, and/or software to be specifically designed for execution of one or more of the operations of method 10.

Figure 3:
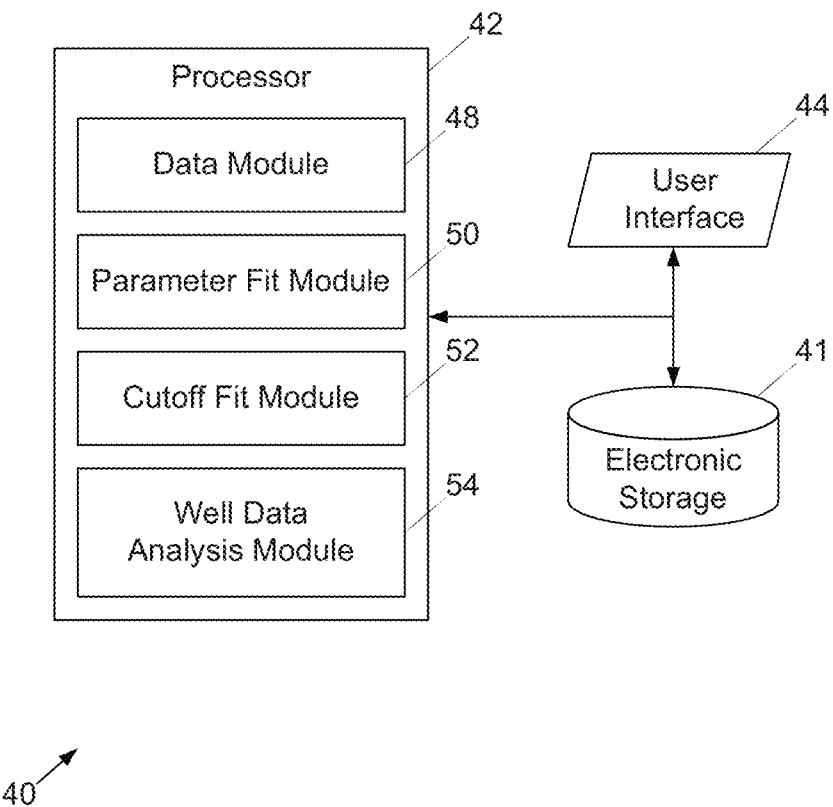
FIG. 3 illustrates a method of determining a relaxation time cutoff for implementation in analyzing nuclear magnetic resonance data.

FIG. 3 illustrates a system 40 configured to determine a relaxation time cutoff for nuclear magnetic resonance measurements of a geological volume of interest. In some implementations, system 40 may include one or more of at least one processor 42, a user interface 44, electronic storage 46, and/or other components.

Processor 42 is configured to execute computer program modules. The computer program modules may include one or more of a data module 48, a parameter fit module 50, a cutoff fit module 52, a well data analysis module 54, and/or other modules.

Data module 48 is configured to obtain information related to individual ones of a plurality of core plugs taken from the geological volume of interest. Such information may include one or more of measured values for one or more of hydraulic permeability $k_{i,meas}$, wettability index $IW_{i,meas}$, porosity $\phi_i$, amplitudes and corresponding $T_2$ relaxation distributions (e.g., $\{A_j^i, T_{2j}^i\}_{j=1\ldots N}$) obtained under full saturation, and/or other information. Obtaining this information may include determining the information, accessing stored information, receiving information over a network, receiving user input, and/or other techniques for obtaining information. In some implementations, data module 48 is configured to perform some or all of the functionality described with respect to operation 16 of method 10 (shown in FIG. 1 and described herein).

Parameter fit module 50 is configured to determine, for individual ones of a plurality of potential relaxation time cutoffs, values for model parameters of a model that predicts permeability and/or wettability of the individual core plugs. Such a determination may include, for a first potential relaxation time, identifying values for the model parameters that fits a permeabilities and/or wettabilities predicted for the core plugs by the model with the measured values for permeability and/or wettability obtained by data module 48. The values for the model parameters determined by parameter fit module 50 are the values that minimize a difference between the predicted permeabilities and/or wettabilities and the measured values. In some implementations, parameter fit module 50 is configured to perform some or all of the functionality described with respect to operations 24 and/or 26 of method 10 (shown in FIG. 1 and described herein).

Cutoff fit module 52 is configured to determine a relaxation time cutoff from the plurality of potential relaxation time cutoffs. This may include identifying a relaxation time cutoff from the plurality of potential relaxation time cutoffs that corresponds to the smallest different in predicted and measured permeability and/or wettability. In some implementations, cutoff fit module 52 is configured to perform some or all of the functionality described above with respect to operation 28 of method 10 (shown in FIG. 1 and described herein).

Well data analysis module 54 is configured to implement the relaxation time cutoff determined by cutoff fit module 52 in subsequent analysis of well data related to the geological volume of interest. In some implementations, well data analysis module 54 is configured to perform some or all of the functionality described with respect to operation 30 (shown in FIG. 1 and described herein).

Processor 42 is configured to provide information processing capabilities in system 40. As such, processor 42 may include one or more of a digital processor, an analog processor, a digital circuit designed to process information, an analog circuit designed to process information, a state machine, and/or other mechanisms for electronically processing information. Although processor 42 is shown in FIG. 3 as a single entity, this is for illustrative purposes only. In some implementations, processor 42 may include a plurality of processing units. These processing units may be physically located within the same device, or processor 42 may represent processing functionality of a plurality of devices operating in coordination. Processor 42 may be configured to execute modules 48, 50, 52, and/or 54 by software; hardware; firmware; some combination of software, hardware, and/or firmware; and/or other mechanisms for configuring processing capabilities on processor 42.

It should be appreciated that although modules 48, 50, 52, and 54 are illustrated in FIG. 3 as being co-located within a single processing unit, in implementations in which processor 42 includes multiple processing units, one or more of modules 48, 50, 52, and/or 54 may be located remotely from the other modules. The description of the functionality provided by the different modules 48, 50, 52, and/or 54 described below is for illustrative purposes, and is not intended to be limiting, as any of modules 48, 50, 52, and/or 54 may provide more or less functionality than is described. For example, one or more of modules 48, 50, 52, and/or 54 may be eliminated, and some or all of its functionality may be provided by other ones of modules 48, 50, 52, and/or 54. As another example, processor 42 may be configured to execute one or more additional modules that may perform some or all of the functionality attributed below to one of modules 48, 50, 52, and/or 54.

Electronic storage 46 may comprise electronic storage media that electronically stores information. The electronic storage media of electronic storage 46 may include one or both of system storage that is provided integrally (i.e., substantially non-removable) with system 40 and/or removable storage that is removably connectable to system 40 via, for example, a port (e.g., a USB port, a firewire port, etc.) or a drive (e.g., a disk drive, etc.). Electronic storage 46 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 46 may include one or more virtual storage resources (e.g., cloud storage, a virtual private network, and/or other virtual storage resources). Electronic storage 46 may store software algorithms, information determined by processor 42, information received through user interface 44, and/or other information that enables system 40 to function as described herein.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A computer-implemented method of determining a relaxation time cutoff for implementation in analysis of nuclear magnetic resonance data, the method being implemented in a computer system comprising one or more physical processors, the method comprising:
    measuring, for individual ones of a plurality of core plugs taken from a geological volume of interest, (i) values of permeability and/or wettability, and porosity, and (ii) nuclear magnetic resonance measurements taken under full brine-saturation using an NMR spectrometer;
    determining, using the computer system, for individual ones of a plurality of potential relaxation time cutoffs, values for one or more model parameters that parameterize a model that is further parameterized by relaxation time cutoff, and predicts permeability and/or wettability as a function of porosity and nuclear magnetic resonance measurements,
    wherein such determination comprises, for a first potential relaxation time, identifying values for the one or more model parameters that fit the predictions of permeability and/or wettability yielded by the model at the first potential relaxation time for the core plugs with the measured values of permeability and/or wettability for the core plugs; and
    identifying, using the computer system, a relaxation time cutoff from the plurality of potential relaxation time cutoffs that provides an enhanced fit of the predictions of permeability and/or or wettability yielded by the model with the measured values or permeability and/or wettability for the individual core plugs.

2. The method of claim 1, wherein the wettability is a wettability index.

3. The method of claim 1, wherein the model is the Coates equation.

4. The method of claim 1, further comprising implementing the identified relaxation time in a generalized logistic equation.

5. The method of claim 1, wherein the identification of the relaxation time cutoff is made without regard for a nuclear magnetic resonance operation performed on the core plugs under irreducible water saturation.

6. The method of claim 1, wherein the enhanced fit is a least squares fit.

7. The method of claim 1, wherein the one or more model parameters include two or more parameters.

8. The method of claim 1, wherein the obtained measured values of permeability and/or wettability, and porosity, and the obtained nuclear magnetic resonance measurements include results of measurements performed on core plugs and/or results of measurements from well logs at or near the location(s) from which the core plugs were taken.

9. A system configured to determine a relaxation time cutoff for implementation in analysis of nuclear magnetic resonance data, the system comprising:
    one or more processors configured to execute computer program modules, the computer program modules comprising:
        a data module configured to obtain, for individual ones of a plurality of core plugs taken from a geological volume of interest, (i) measured values of permeability and/or wettability, and porosity, and (ii) nuclear magnetic resonance measurements taken under full brine-saturation;
        a parameter fit module configured to determine, for individual ones of a plurality of potential relaxation time cutoffs, values for one or more model parameters that parameterize a model that is further parameterized by relaxation time cutoff, and predicts permeability and/or or wettability as a function of porosity and nuclear magnetic resonance measurements,
        wherein such determination comprises, for a first potential relaxation time, identifying values for the one or more model parameters that fit the predictions of permeability or porosity yielded by the model at the first potential relaxation time for the core plugs with the measured values of permeability and/or wettability for the individual core plugs; and
        a cutoff fit module configured to identify a relaxation time cutoff from the plurality of potential relaxation time cutoffs that provides an enhanced fit of the predictions of permeability and/or wettability yielded by the model with the measured values or permeability and/or wettability for the individual core plugs.

10. The system of claim 9, wherein the wettability is a wettability index.

11. The system of claim 9, wherein the model is the Coates equation.

12. The system of claim 9, wherein the cutoff fit module is configured to identify the relaxation time cutoff without regard for a nuclear magnetic resonance operation performed on the core plugs under irreducible water saturation.

13. The system of claim 9, wherein the enhanced fit is a least squares fit.

14. The system of claim 9, wherein the one or more model parameters include two or more parameters.

15. The system of claim 9, wherein the data module is configured such that the obtained measured values of permeability and/or wettability, and porosity, and the obtained nuclear magnetic resonance measurements include results of measurements performed on core plugs and/or results of measurements from well logs at or near the location(s) from which the core plugs were taken.

* * * * *